United States Patent

[11] 3,596,509

| [72] | Inventor | Giulio Raffaelli<br>via del Duomo 12, Lucca, Italy |
|---|---|---|
| [21] | Appl. No. | 850,992 |
| [22] | Filed | Aug. 18, 1969 |
| [45] | Patented | Aug. 3, 1971 |
| [32] | Priority | Mar. 26, 1966, June 3, 1966, Jan. 19, 1967, Aug. 20, 1968 |
| [33] | | Italy |
| [31] | | 16027/66, 18647/66, 32902/67 and 32911/68 |
| | | Continuation-in-part of application Ser. No. 624,805, Mar. 21, 1967. |

[54] APPARATUS FOR MEASURING TIRE PRESSURES
6 Claims, 3 Drawing Figs.

[52] U.S. Cl. .................................................. 73/146.3,
73/393, 137/227, 137/557
[51] Int. Cl. ........................................................ B60c 23/02
[50] Field of Search .......................................... 73/146.3,
401, 146.8; 340/58; 137/227, 557

[56] References Cited

UNITED STATES PATENTS

| 2,693,113 | 11/1954 | Hejduk ........................ | 73/393 |
| 2,722,641 | 11/1951 | Cross ........................... | 73/393 X |
| 2,761,043 | 8/1956 | Larson ......................... | 73/393 X |
| 3,272,008 | 9/1966 | Lamperti ..................... | 73/146.3 |

FOREIGN PATENTS

| 199,632 | 6/1923 | Great Britain ............... | 73/146.8 |

*Primary Examiner*—Louis R. Prince
*Assistant Examiner*—Daniel M. Yasich
*Attorney*—Newton, Hopkins & Ormsby ABSTRACT: A pressure gauge for communication with the air in a tire including a graduated circular scale rotatable with respect to a pointer in response to the pressure in the tire. The pointer is operatively connected to a galvanometer controlled by a circuit having two thermistors responsive to the temperatures of the air in the tire and the ambient air respectively.

PATENTED AUG 3 1971 3,596,509

INVENTOR
GIULIO RAFFAELLI
BY Newton, Hopkins, & Ormsby
ATTORNEY

APPARATUS FOR MEASURING TIRE PRESSURES

CROSS REFERENCE TO RELATED APPLICATION

This application is a continuation-in-part of my copending application, Ser. No. 624,805, filed Mar. 21, 1967, for "Method and Apparatus for Measuring the Pressure of Hot Tires" and now U.S. Pat. No. 3,494,184.

BACKGROUND OF THE INVENTION

With pressure gauges presently installed at service stations, it is not possible to insure tire pressures of prescribed values because such gauges do not compensate for the pressure due to the heat of the tire generated by travel. Since the pressure tables supplied by manufacturers of motor vehicles and tires are based on pressures in "cold" tires, i.e., tires at ambient temperature, and since these prior art pressure gauges do not account for the extent of pressure increase due to heat, it is impossible to know whether the pressure in the tire is the one prescribed by the table.

SUMMARY OF THE INVENTION

These and other problems are overcome by the invention disclosed herein in that the pressure gauge indicates the pressure in a tire corrected to the temperature that the tire would have if it were at ambient temperature. Therefore, it is the primary object of the present invention to provide a pressure gauge for the measurement of the air pressure in tires, which supplies, not the actual value of the pressure in the tire, but the value of the pressure the tire would have it if were at ambient temperature. This insures proper tire pressure as indicated by the manufacturer's tables regardless of the actual temperature of the tire.

In order to make this compensated measurement, the indication supplied by the pressure gauge is combined with that provided by a galvanometric instrument whereby the gauge indicates the actual pressure of the tire and causes a graduated scale to rotate, while the galvanometric instrument detects by means of an appropriate pickup the increase in the temperature of the tire with respect to the ambient temperature and causes a displacement of an indicator pointer coaxially with respect to the graduated scale. Thus, the value read on the scale corresponding to the moving hand is the result of the actual pressure in the tire (displacement of the scale) less the increment due to the heating (displacement of the pointer) which is the pressure the tire would have at ambient temperature.

The gauge can be of any known type suitable for supplying the necessary power to move the scale; for example, that consisting of a piston actuated by the pressure in question and counterbalanced by a spring (to be used preferably in a portable model), or counterbalanced by the force of gravity (to be used preferably in a fixed installation). It is desirable that the kinematics actuating the scale be such as to render the graduation on the scale logarithmic, with the accuracy such that the pressures in question are the difference between the atmospheric pressure and the absolute pressure existing inside of the tire, so that the decimal graduation in atm. between two whole values should be one which, in a true and proper logarithmic scale, would lie between the two corresponding values increased by a unity. This is in order to render the displacement of the pointer required to bring about the desired correction easier depending on the value of the pressure in question.

The galvanometric instrument should insure a shift in the pointer which is approximately equal to $(T_p/T_a)-1$ where $T_p$ is the actual absolute temperature of the air in the tire and $T_a$ is the absolute temperature of the ambient air. For this purpose the galvanometric instrument is provided with two coils operatively connected to the pointer, each of which has an electrical current circulating therethrough responsive to the air in the tire and the ambient air respectively. The galvanometer is not of the thermic type, but it is a simple galvanometer with stationary magnet and movable coil; so the windings are made of simple insulated copper wire. The coils may be placed either on crossed planes ("logometric" galvanometer type, e.g. "ohmmeter" or in the same plane ("differential" type galvanometer) as long as the sum of the currents is kept constant. In a portable version of the instrument it is preferable to employ a differential type galvanometer and a single coil with a shunt using a central current intake for simplicity.

These and other objects, features, and advantages of the invention disclosed herein will be more clearly understood upon consideration of the following detailed description and accompanying drawings wherein like characters of reference designate corresponding parts throughout the several views and in which.

These figures and the following detailed description disclose specific embodiments of the invention, however, it is to be understood that the inventive concept is not limited thereto since it may be embodied in other forms.

DESCRIPTION OF ILLUSTRATIVE EMBODIMENTS

Figure 1:
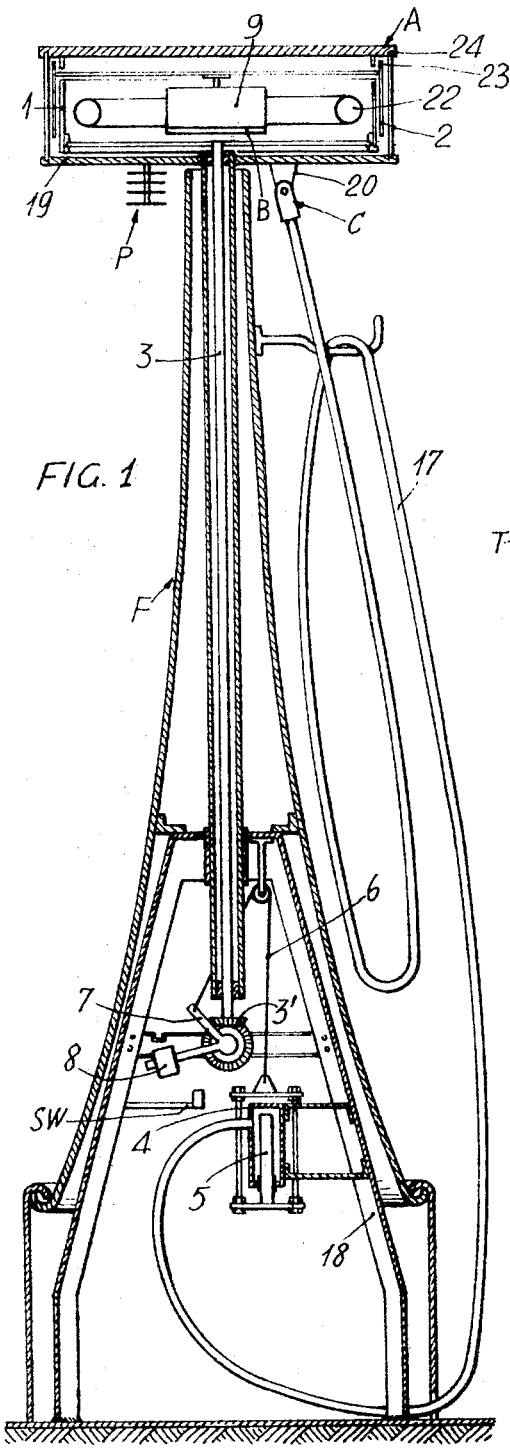
FIG. 1 is a diagrammatically vertical sectional view of one embodiment of the invention.

Referring to FIG. 1, the apparatus of the invention includes generally a support frame F which carries the gauge assembly A and cup assembly C. The apparatus shown is for a fixed installation, however, it is to be understood that a portable model may be easily constructed using the principles of the apparatus disclosed.

The gauge assembly A includes a casing 19 mounted on top of frame F. A cylindrical graduated indicator scale 1 is rotatably mounted in casing 19 on a vertically extending axle 3 rotatably carried by frame F. The scale 1 is rotated in response to the pressure of the air in the tire. The axle 3 is rotated by a cylinder 4 fixed within frame F which has its piston 5 connected to an arm 7 and a counterweight 8 through a flexible cable 6. Movement of arm 7 by movement of piston 5 under the influence of the tire pressure, as will be explained, causes gears 3' driven by arm 7 to rotate axle 3. Therefore, the movement of scale 1 is proportional to the tire pressure since the air pressure will cause counterweight 8 to pivot and scale 1 to rotate until equilibrium is reached. In order to have the graduation scale 1 approximate satisfactorily the above theoretical value described, i.e., pseudologarithmic, it is possible to vary, depending on the range of pressures at which the instrument is designed to operate and on the designed geometry of the latter, either the initial position of the counterweight 8 with respect to the vertical or the angle between the latter and the arm 7; or arm 7 may be replaced by a cam having the necessary configuration.

The air in the tire is supplied to cylinder 4 to cause piston 5 to move through a hose 17 connected to a cap 15 in cap assembly C. Cap 15 is applied to the valve stem of a tire (not shown) to admit air from the tire into cylinder 4. The extra length of hose 17 may be stored in chamber 18 in the base of frame F.

The gauge assembly A further includes a pointer 2 mounted in the casing 19 outboard of scale 1 for coaxial rotation with respect to scale 1. The pointer 2 is carried by the output arm or moving element of a differential galvanometer 9 carried in casing 19 as seen in FIG. 1.

Figure 2:
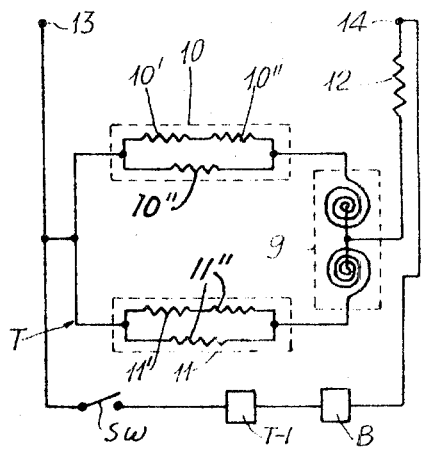
FIG. 2 is a schematic electrical diagram for the invention.

The galvanometer 9 is connected in temperature compensating circuit T as seen in FIG. 2. The galvanometer 9 has two current responsive coils operatively connected to pointer 2, one of which is connected in series with a pickup 10 having a resistance responsive to the ambient air temperature, and the other of which is connected in series with a pickup 11 responsive to the temperature of the air in the tire. The pickup 10 includes a thermistor 10' and equalizing resistors 10'', one resistor 10'' being in parallel with thermistor 10' and one in series therewith. Likewise, the pickup 11 includes a thermistor 11' and equalizing resistors 11'', one resistor 11'' being in parallel with thermistor 11' and one in series therewith. The resistance values of resistors 10'' and 11'' are determined as a function of the characteristics of the particular thermistors 10' and 11' used or of the temperature-resistance curve desired in order to observe the operation set forth above.

The total current circulating in circuit T is maintained almost constant by feeding the current through each coil through the resistor 12 of rather high resistance value with respect to that of the pickups 10 and 11. The voltage applied to the ends 13 or 14 of the measuring circuit T is therefore preferably stabilized and the displacement of the pointer 2 on the galvanometer 9 is proportional to $(R10-R11)/(R10+R11)$, where $R10$ and $R11$ are the total resistance values of the two pickups 10 and 11. Since the difference between $R10$ and $R11$ is not high, percentagewise, this behavior approximates satisfactorily that referred to in the principle indicated above. The resistance 12 may be made variable both for the calibration and for rendering the displacement of the pointer 2 proportional to the pressure whether the scale is linear and not logarithmic. This may be accomplished with a rheostat actuated by the member which picks up the pressure. The galvanometer 9 is provided with an electromagnetic brake B, seen in FIG. 1, which permits the locking of the pointer 2 in the position reached at the moment the brake B is exited. The brake, in turn, is excited by a timer T—1 which is controlled by a switch SW actuated by the movement of the counterweight 8 or by a member carried by counterweight 8. Therefore, after a predetermined period of time from the beginning of the removal of air from the tire (determined by the actuation of the microswitch SW), the pointer 2 of the galvanometer 9 remains locked in the proper position to insure the required compensation.

Figure 3:
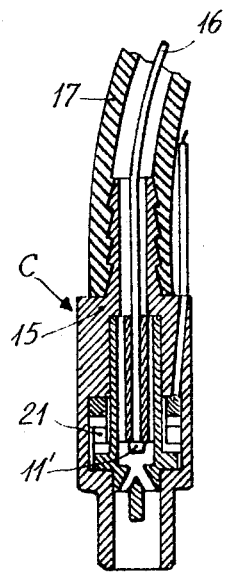
FIG. 3 is a cross-sectional view of a cap of the invention to be applied to the valve of the tire for taking the air pressure.

It is desirable that the air gap in the galvanometer 9 be appropriately shaped to compensate for the errors which are found in the displacement of the pointer 2 of the galvanometer with respect to the principle it is desired to follow because of nonlinearity between the temperature increments detected by the pickup 11 measuring the temperature of the air taken from the tire and the actual temperatures and because of variation in the values detected by the pickup 11 measuring the temperature of the air taken from the tire which is dependent on the air pressure in the tire. The thermistor 11' which measures the temperature of the air taken from the tire is contained in the cap 15, shown in FIG. 3, to be applied to the valve of the tire, and is electrically connected to the circuit T contained between the instrument by a cable 16 passing preferably between the same air delivery and removal hose 17.

To prevent the pickup 11 from overheating if exposed to the sun, with a consequent error in the measurement, there is provided under the casing 19 containing the scale a holder 20 for attaching thereto the cap 15 so that it remains in the shade and is ventilated. Also, a series of thermal cooling elements 21 of suitable geometrical configuration may be provided in cap 15 which act as a thermostat with respect to the ambient temperature for the thermistor 11'. The ambient temperature is picked up by the thermistor 10' located in a finned probe P which is also placed, preferably, beneath the casing 19. In order to permit the reading at night, a torodial shaped light bulb 22 is inserted in casing 19 to illuminate scale 1. It is also possible to integrate another indicator 23 on the operating arm of galvanometer 9 which moves with respect to a scale 24 to indicate either the amount of heating in the tire or the value of the correction made in the pressure reading.

In that embodiment shown, the galvanometer has a second pointer 2 and the scale 1 has a double graduation so that the instrument is readable on both sides.

While specific embodiments of the invention have been shown and described hereinabove, it is to be understood that substitutions, equivalents and modifications may be used without departing from the scope of the inventive concept.

I claim:

1. An apparatus for measuring the inflation pressure in tires corrected for temperature variations to ambient temperature comprising:
   support means;
   a graduated scale rotatably carried by said support means;
   driving means operatively connected to said scale and to said tire for rotating said scale in response to the actual inflation pressure in said tire;
   indicator means carried by said support means and overlying said scale to indicate the reading on said scale; and
   galvanometric means including means operatively connected to said indicator means and to said tire for shifting said indicator means with respect to said scale to cause said indicator means to indicate a reading on said scale corresponding to the inflation pressure the tire would have had if the tire were at ambient temperature.

2. Apparatus as set forth in claim 1 further including brake means for selectively locking the position of said indicator means a predetermined period of time after said driving means has rotated said scale.

3. Apparatus as set forth in claim 1 wherein said driving means includes mechanism for causing said scale to be rotated logarithmically in response to the inflation pressure in the tire.

4. Apparatus as set forth in claim 1 wherein said galvanometric means includes a pointer, a galvanometer, a first pickup responsive to the ambient air temperature operatively connected to said galvanometer, and a second pickup responsive to the air in the tire operatively connected to said galvanometer, said galvanometer constructed and arranged to combine the outputs differentially from said pickups and shift said pointer.

5. Apparatus as set forth in claim 2 wherein said brake means includes an electromagnetic brake, a timer, and a switch electrically connected in series, said switch activated by said driving means as said driving means shifts said scale and said timer actuating said brake a predetermined period of time after said switch is activated.

6. Apparatus as set forth in claim 4 wherein said galvanometer defines an air gap shaped so as to compensate for the deviations in the displacement of said pointer.